(12) United States Patent
Wable et al.

(10) Patent No.: US 10,778,733 B2
(45) Date of Patent: Sep. 15, 2020

(54) SYSTEM AND METHOD OF FACILITATING COMMUNICATIONS BETWEEN MEMBERS OF A SOCIAL NETWORKING GROUP

(71) Applicant: Dropbox, Inc., San Francisco, CA (US)

(72) Inventors: Akhil Wable, San Francisco, CA (US); Aditya Agarwal, San Francisco, CA (US); Ruchi Sanghvi, San Francisco, CA (US); Joshua Jenkins, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 396 days.

(21) Appl. No.: 13/832,774

(22) Filed: Mar. 15, 2013

(65) Prior Publication Data
US 2014/0082101 A1 Mar. 20, 2014

Related U.S. Application Data

(60) Provisional application No. 61/702,344, filed on Sep. 18, 2012.

(51) Int. Cl.
*H04L 29/06* (2006.01)
*H04L 12/58* (2006.01)
*H04L 29/08* (2006.01)

(52) U.S. Cl.
CPC ............ *H04L 65/403* (2013.01); *H04L 51/32* (2013.01); *H04L 67/306* (2013.01)

(58) Field of Classification Search
CPC ...... H04L 65/403; H04L 67/306; H04L 51/32
USPC ........................................................ 709/206
See application file for complete search history.

(56) References Cited

U.S. PATENT DOCUMENTS

| | | | |
|---|---|---|---|
| 8,527,489 B1* | 9/2013 | Li | G06F 17/30867 707/706 |
| 2005/0038856 A1* | 2/2005 | Krishnasamy | H04L 29/06 709/206 |
| 2008/0005072 A1* | 1/2008 | Meek | G06F 17/30867 |
| 2009/0070334 A1* | 3/2009 | Callahan et al. | 707/9 |
| 2009/0171691 A1* | 7/2009 | Lubarski | G06F 17/3089 705/319 |
| 2011/0055725 A1* | 3/2011 | Folgner | G06F 3/0486 715/753 |
| 2011/0208816 A1* | 8/2011 | Chavez | G06Q 10/107 709/206 |
| 2011/0320423 A1* | 12/2011 | Gemmell | G06F 7/00 707/706 |
| 2012/0110096 A1* | 5/2012 | Smarr | H04W 4/21 709/206 |

(Continued)

*Primary Examiner* — Nicholas R Taylor
*Assistant Examiner* — Tania M Pena-Santana
(74) *Attorney, Agent, or Firm* — Polsinelli PC

(57) ABSTRACT

A social networking system that enables a member of social networking site to search for other members whose group profiles satisfy one or more search criteria. The system further enables the member to select one or more of the members whose profile satisfies the search criteria, and enables a communication between the member and the selected members. Thus, the member may send a communication to all members whose profiles satisfy the search criteria, or to a subset of those members whose profiles satisfy the search criteria. The communication may be an e-mail, an invitation, a chat message, a private positing on a public message board, a text message or any other suitable type of communication.

18 Claims, 16 Drawing Sheets

(56) References Cited

U.S. PATENT DOCUMENTS

2013/0024516 A1\* 1/2013 Blinder .................. 709/204
2013/0198299 A1\* 8/2013 Chhaochharia ....... G06Q 30/02
709/206

\* cited by examiner

FIG. 6

TED2012
Full Spectrum

- ⌂ Home
- 👥 Members
- 📅 Calendar
- ✉ Messages
- ⊙ Notifications
- ✕ Admin Panel

Subgroups
- Administrators
- After Hours Drinks
- Meetups
- Announcements
- Book Club
- Design
- Education
- *View all subgroups...*

Big Changes at Cove
Cove is joining the team at Dropbox. To learn how this transition will affect your group, read the announcement cove

👤 Karl

Create New Post | Search Members, Subgroups or Posts... 🔍

👥 1342 Members

M|
M|

Donald Min Member
Anupam Mukerji Member
The Prankster
Nate Mook Member
New York, NY
Matt Drance Member
San Jose, CA

| | | |
|---|---|---|
| Aditya Agarwal San Francisco, California | Tom Rielly | |
| Steve | Donald Min | |
| Karl | Adam A | |
| Thaniya Keereepart Brooklyn, NY | Chris Anderson New York, New York, United States | |
| June Cohen New York, New York, United States | Emily McManus Editor, TED.com | |
| Anupam Mukerji The Prankster | Anoop Gupta Woodinville, Washington | |
| Kari Nathon Jung San Francisco, California | Steven Nugent | |

See more

Filter Members by
- Name
- City
- Subgroups
- Company / Organization
- School / College
- Projects / Interests
- Gender: All

TED2012
Full Spectrum

← 334

🏠 Home
👥 Members
📅 Calendar
✉ Messages
🔔 Notifications
✗ Admin Panel

—— Subgroups ——
⚙ Administrators
After Hours Drinks
Meetups
Announcements
Book Club
Design
Education
*View all subgroups...*

332 →

Big Changes at Cove
Cove is joining the team at Dropbox. To learn how this transition will affect your group, read the announcement

| Create New Post | Search Members, Subgroups or Posts... 🔍 |

👥 1342 Members

Micr
─────────
Micr
─────────
Microsoft School / College ── 822
Microbiology And Molecular Biology Reviews Company / Organization ── 824
Microcar Company / Organization ── 826
MicroProse Company / Organization

810

828

| 👤 Akhil Wable<br>New Delhi, India | 👤 Roxanne Hai<br>Brooklyn, NY |
| --- | --- |
| 👤 Aditya Agarwal<br>San Francisco, California | 👤 Tom Rielly |
| 👤 Steve | 👤 Donald Min |
| 👤 Karl | 👤 Adam A |
| 👤 Thaniya Keereepart<br>Brooklyn, NY | 👤 Chris Anderson<br>New York, New York, United States |
| 👤 June Cohen<br>New York, New York, United States | 👤 Emily McManus<br>Editor, TED.com |
| 👤 Anupam Mukerji<br>The Prankster | 👤 Anoop Gupta<br>Woodinville, Washington |
| 👤 Kari Nathon Jung<br>San Francisco, California | 👤 Steven Nugent |

*See more* cove

👤 Karl ⚙

Filter Members by

| Name |
| City |
| Subgroups |
| Company / Organization |
| School / College |
| Projects / Interests |
| Gender: All ▼ |

↙ 813

Feedback & Support

FIG. 8C

SYSTEM AND METHOD OF FACILITATING COMMUNICATIONS BETWEEN MEMBERS OF A SOCIAL NETWORKING GROUP

CLAIM OF PRIORITY

This application claims priority under 35 U.S.C. § 119(e) to the filing date of U.S. Provisional Patent Application No. 61/702,344, filed Sep. 18, 2012, entitled, "A System And Method Of Facilitating Communications Between Members Of A Social Networking Group," which is incorporated herein by reference in its entirety.

BACKGROUND

Social networking sites allow users to collaborate and share information and also allow members to join different groups that cater to their interests. Although current social networking sites often facilitate direct communication between members or pre-specified groups of members, there is a need for improved systems and methods for facilitating communication between an individual and groups of individuals who are determined on an ad hoc basis.

SUMMARY

A computer-implemented method, according to various embodiments, provides a user of a social networking site with the ability to enable communications between a particular user in a group and one or more other users in the group. In various embodiments, the method comprises the steps of: (1) receiving a first user criterion specified by the particular user; (2) receiving a second user criterion specified by the particular user; (3) identifying, from the plurality of users, a first subset of users that each satisfy the first and second user criteria; (4) selecting a second subset of users from the first subset of users; and (5) after selecting the second subset of users, facilitating the transmission of a message from the particular user to the second set of users.

A computer implemented method, according to various embodiments, for facilitating communication between a particular member of a group on a social networking site and one or more other members of the group on the social networking site comprises: (1) receiving a first set of information from each one of a plurality of members of the group in response to each one of the plurality of members completing a member profile template that is specific to the group on the social networking site; (2) in response to receiving the first set of information from the plurality of members, creating a member profile for each one of the plurality of members, wherein the member profiles are unique to the group; (3) receiving a request, from the particular member, to search the plurality of member profiles for a first criterion; (4) in response to receiving the request, searching the plurality of member profiles for the first criterion; (5) presenting a group of members from the plurality of members whose member profile satisfies the first criterion; and (6) facilitating a communication between the particular user and a subset of the group of members. In some embodiments, the communication is an e-mail message. In other embodiments, the communication is a private positing on a public wall that can only be viewed by the second subset of users.

In certain embodiments, the plurality of users includes members of a group within the context of a social networking site. In various embodiments, the step of identifying the first subset of users further comprises reviewing a profile for each of the plurality of users to determine whether each of the plurality of users satisfies the first and the second user criteria, wherein the profile is unique to the group to which the plurality of users belong on the social networking site. In still other embodiments, the step of facilitating the transmission of the message from the particular user to the second subset of users comprises facilitating the transmission of the message from the particular user to only the second subset of users. In various embodiments, facilitating a communication between the particular user and the subset of members further comprises sending an e-mail to the subset of members.

A computer-implemented method of facilitating communication between a particular member of a social networking group and one or more other members of the social networking group, in various other embodiments, comprises: (1) receiving a set of information for each member of the social networking group; (2) in response to receiving the set of information for each member of the social networking group, creating a member profile for each member of the social networking group, wherein the member profile is unique to the social networking group; (3) receiving a first criterion specified by the particular member; (4) in response to receiving the first criterion, identifying a first subset of members whose member profile satisfies the first criterion; (5) presenting the first subset of members to the particular member; (6) receiving a second criterion specified by the particular member; (7) in response to receiving the second criterion, identifying a second subset of members whose member profile satisfies the first and the second criteria; (8) presenting the second subset of members to the particular member; (9) receiving a selection, by the particular member, of a third subset of members from the second subset of members; and (10) in response to receiving the selection of the third subset of members, facilitating a communication between the particular member and the third subset of members. In various embodiments, the first criterion is a school name. In still other embodiments, the second criterion is a name of a city.

In other embodiments, the step of presenting the first subset of members further comprises displaying a portion of the member profile for each member of the first subset of members. In still other embodiments, the step of presenting the second subset of members further comprises displaying a portion of the member profile for each member of the second subset of members. In these embodiments, the step of presenting the second subset of members further comprises displaying a check box next to each of the member in the second subset of members, wherein each check box corresponds to a respective one of the second subset of members and is configured to allow the particular member to select the respective one of the second subset of members, wherein the members whose check box is selected comprise the third subset. In other embodiments, the step of facilitating a communication further comprises sending an e-mail from the particular member to the third subset of members.

BRIEF DESCRIPTION OF THE DRAWINGS

Various embodiments of a computer system for a social networking site that facilitates communication between a particular member of a group and a subset of members of the group are described below. In the course of this description, reference will be made to the accompanying drawings, which are not necessarily drawn to scale, and wherein:

FIG. 6 is a screen display according to a particular embodiment that shows a members page for the group whose home page is shown in FIG. 5;

FIGS. 8A-8E are screen displays according to a particular embodiment that shows an initial search of the members of the group whose home page is shown in of FIG. 5;

DETAILED DESCRIPTION OF VARIOUS EMBODIMENTS

Figure 1:
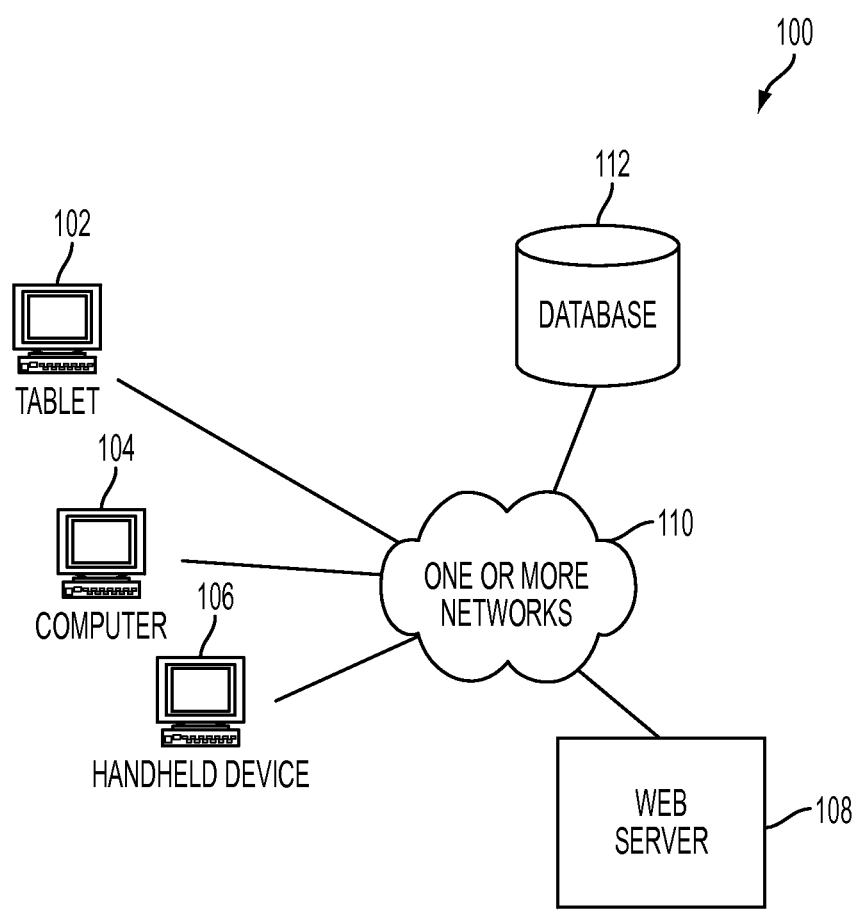
FIG. 1 is a block diagram of a social networking system according to a particular embodiment.

Various embodiments now will be described more fully hereinafter with reference to the accompanying drawings. It should be understood that the invention may be embodied in many different forms and should not be construed as limited to the embodiments set forth herein. Like numbers refer to like elements throughout.

System Overview

A computer system, according to various embodiments, is adapted for providing a social networking site that allows users to join and interact with different groups of other users. Particular user groups may, for example, be formed based upon the personal or professional interests of the users, the users' educational backgrounds, or any other suitable criteria. Examples of social networking sites on which various methods described herein may be used include Facebook, Twitter, MySpace, LinkedIn, and any other social networking site that allows users to join multiple groups.

A system according to various embodiments enables users to join multiple groups on a social networking site, and to create a unique profile for each group that they join on the site. In a particular embodiment, each profile has a default set of user fields, and a set of customized, administrator-created fields. Members of a group may be required to create a profile when joining the group using a profile template that has been specifically generated for the group. Thus, if the same user joins a second group, they must create a new (e.g., different) profile for the second group based on a profile template that is unique to the second group. In some embodiments, the system may use information from the first profile to pre-populate the second profile if the second profile is to include information that is similar information from the first profile. However, users may be allowed to change the pre-populated information in the second profile to make it more specific to the second group.

In various embodiments, the default user fields for a particular group profile include the following information: (1) name; (2) gender; (3) e-mail address; and (4) city of residence. The custom fields may be administrator defined and may be, for example, in the form of free text or a list of items. The custom fields may be fully customizable and may, in various embodiments, not be limited in any way, except as to whether information for each field is received in free text or list format.

In various embodiments, the system also provides a member search capability using free text searching that allows users to search for other members based on information included within the users' respective user profiles. By searching on specific fields from within the users' profiles, a user may filter the member group down to a subgroup of members that meet certain criteria important to the searcher. The system may further be configured to allow the user to send specific messages, or invitations to the filtered subgroup of members, or to initiate chat communications with the subgroup of members. Thus, the system provides an efficient means for choosing a subgroup of members and for communicating directly with those members.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of a social networking system 100 according to a particular embodiment. As may be understood from this figure, social networking system 100 includes one or more remote computing devices such as a tablet computer 102, a desktop or laptop computer 104, or a handheld computing device 106 (such as a cellular phone) that are in communication with a web server 108 (which, for example, may be used to execute one or more modules as described below) and a database 112 (which, for example, may be used to store the web content discussed below) via one or more computer networks 110. Networks 110 may include any of a variety of types of wired or wireless computer networks such as the Internet. The communication link between web server 108 and database 112 may be, for example, implemented via a Local Area Network (LAN) or via the Internet.

Figure 2:
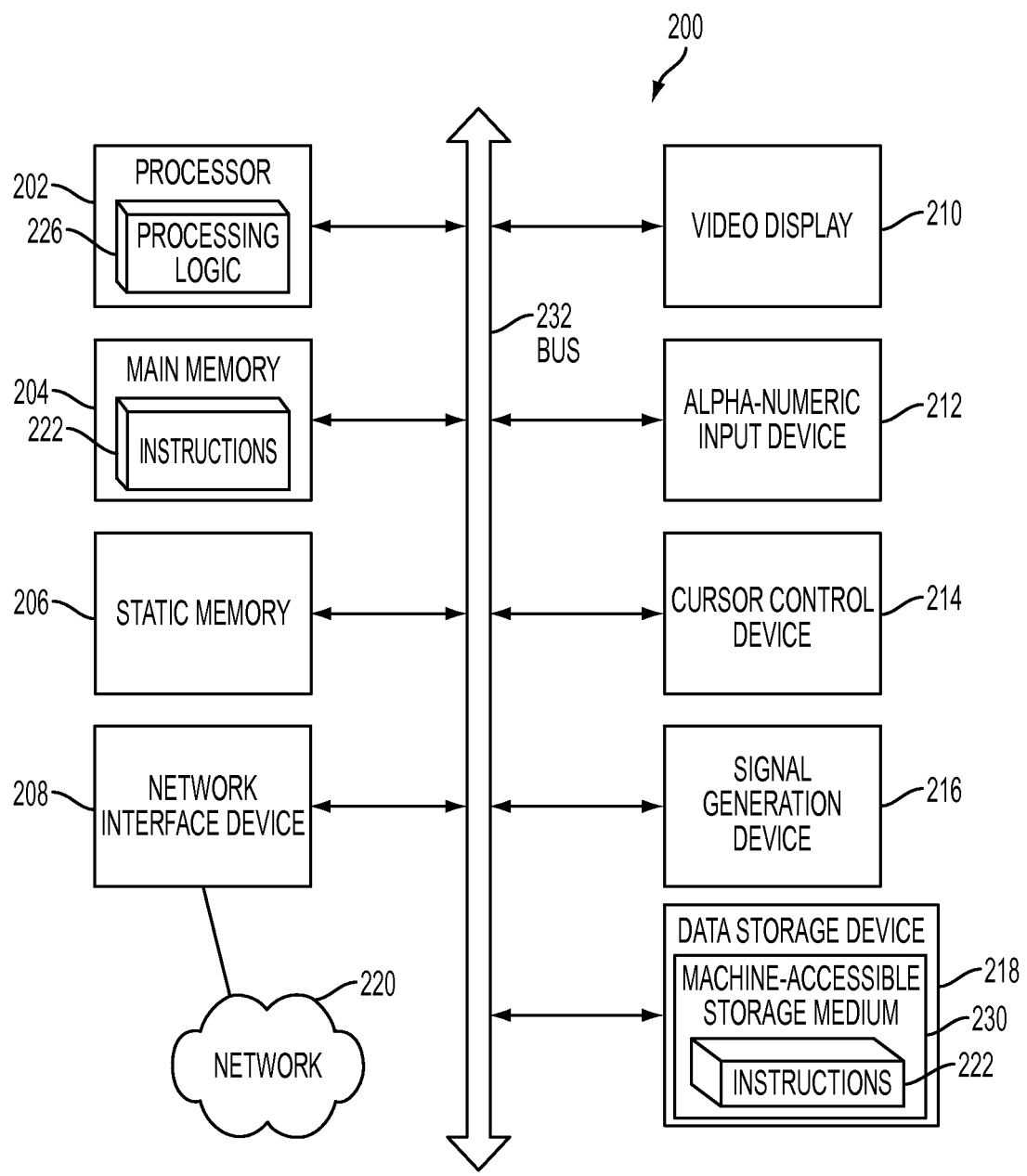
FIG. 2 is a block diagram of a computer that is suitable for use within the social networking system.

FIG. 2 illustrates a diagrammatic representation of a computer 200 that can be used within social networking system 100, for example, as a client computer (e.g., one of the client computers 102, 104, 106 shown in FIG. 1), or as a server computer (e.g., the Web server 108 shown in FIG. 1).

In particular embodiments, computer 200 may be connected (e.g., networked) to other computers in a LAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC) 104, a tablet PC 102, a handheld device 106, a Personal Digital Assistant (PDA), a web appliance, or any computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

The exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

Processing device 202 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 202 may also be one or more special-purpose processing devices such as an application specific integrated circuit (ASIC), a field programmable gate array (FPGA), a digital signal processor (DSP), network processor, or the like. Processing device 202 may be configured to execute processing logic 226 for performing various operations and steps discussed herein.

Computer 200 may further include a network interface device 208. Computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

Data storage device 218 may include a non-transitory computer-accessible storage medium 230 (also known as a non-transitory computer-readable storage medium or a non-transitory computer-readable medium) on which is stored one or more sets of instructions (e.g., the method steps embodied in a search & communication module 222) embodying any one or more of the methodologies or functions described herein. Search & communication module 222 may also reside, completely or at least partially, within main memory 204 and/or within processing device 202 during execution thereof by computer 200, the main memory 204 and processing device 202 also constituting computer-accessible storage media. Search & communication module 222 may further be transmitted or received over a network 220 via the network interface device 208.

While computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" shall also be understood to include any medium that is capable of storing, encoding or carrying a set of instructions for execution by the computer and that cause the computer to perform any one or more of the methodologies of the present invention. The term "computer-accessible storage medium" shall accordingly be understood to include, but not be limited to, solid-state memories, optical and magnetic media, etc.

Exemplary System Operation

Exemplary User Pages

Figure 3:
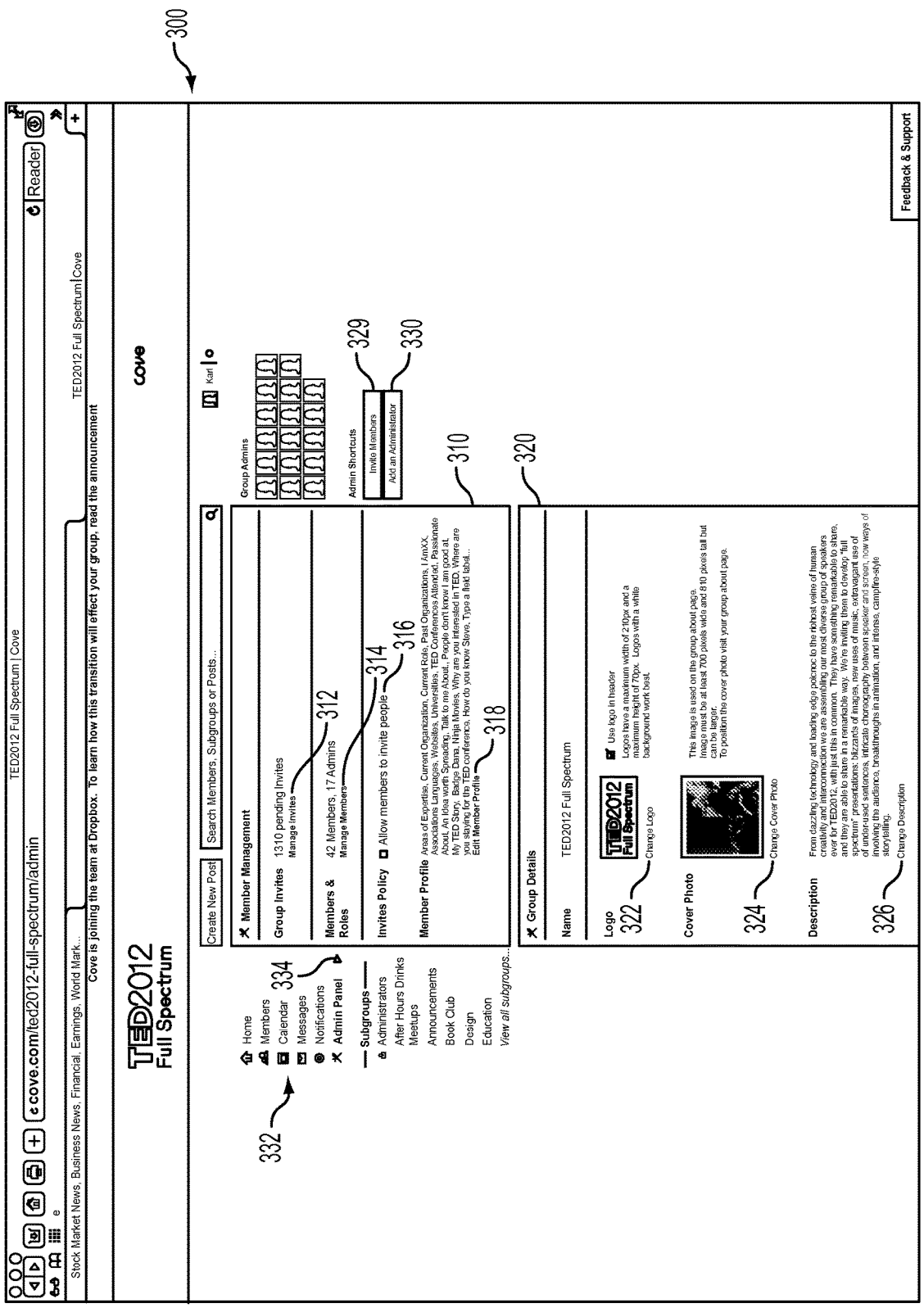
FIG. 3 is a screen display according to a particular embodiment that shows Member Management and Group Details portions of a page on a social networking site according to a particular embodiment.

An exemplary user interface for a particular social networking site according to a particular embodiment is shown in FIGS. 3-10. FIG. 3 illustrates a Member Management section 300 of an Administration Panel 302 for a TED2012 user group. This page is initially displayed to a user (in this case a user with administrator rights) when the user sets up a new group on social networking system 100. This page includes, for example, a Member Management section 310 and a Group Details section 320. The Member Management section 310 allows the administrator of the group to manage invitees by selecting a "manage invites" link 312, change the roles served by the group's members (e.g., provide members with administrator rights) by selecting a "manage members" link 314, change the group's invitee policy by selecting a "allow members to invite people" check box 316, and edit the group's member profile requirements by selecting a "edit member profile" link 318. Group Details section 320 allows the administrator to enter and display information about the group. For example, in various embodiments, the group administrator can add or change the group's logo by selecting a "change logo" link 322, add or change the group's cover photo by selecting a "change cover photo" link 324, and add or edit the description of the group by selecting a "change description" link 326. This page also enables administrators to invite new members to the group by selecting a "invite members" button 329 and to add new administrators to the group by selecting "add an administrator" button 330. A navigation panel 332 is positioned on a side of the page and allows the administrator and members of the group to navigate to different pages associated with the group. Navigation panel 332 is displayed on each page and provides an indicator 334 that notifies the user which page is active.

Figure 4:
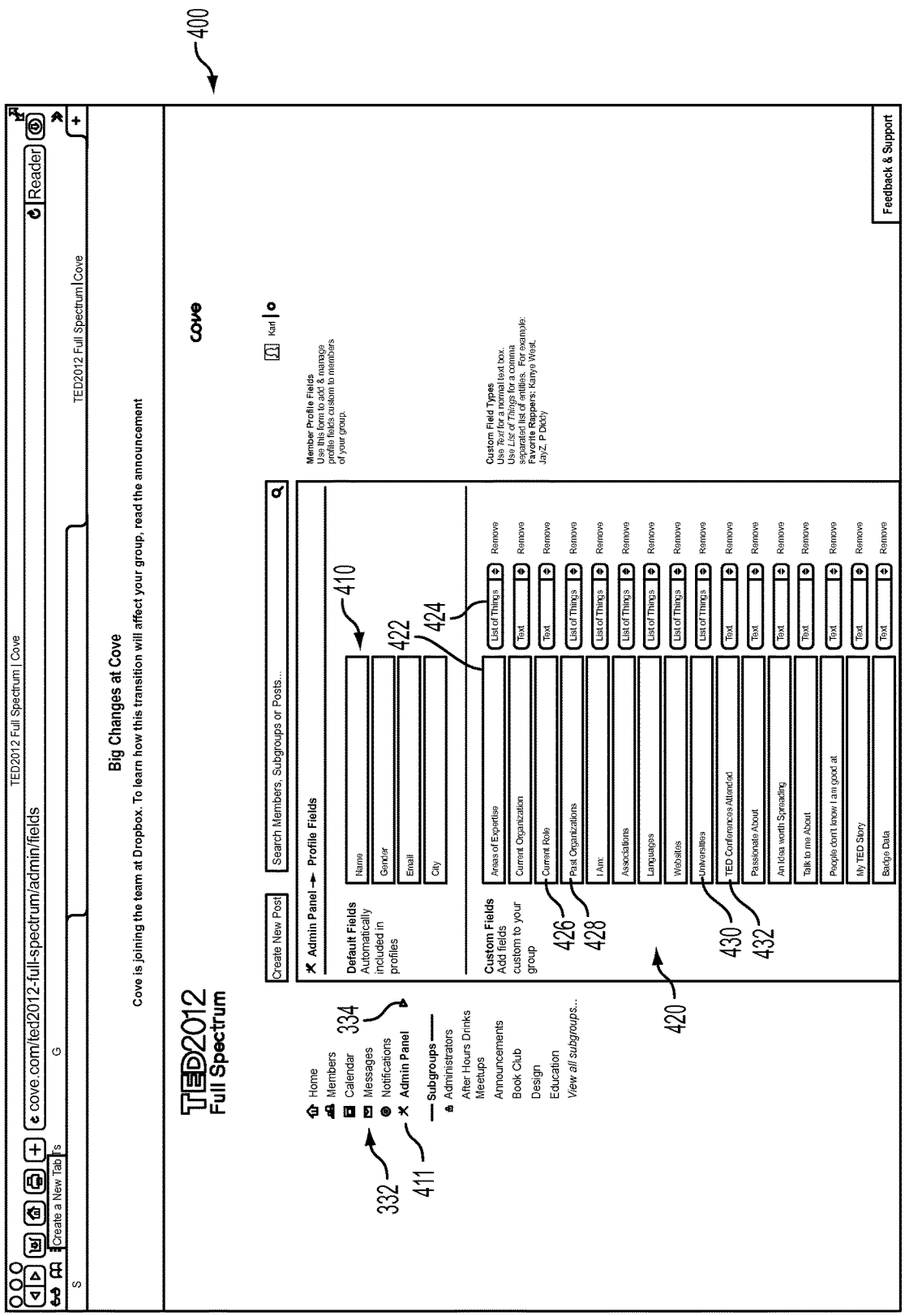
FIG. 4 is a screen display according to a particular embodiment that shows a profile template according to a particular embodiment. The profile template is shown within the context of an administration panel that may be used to modify the fields that are included within a particular group profile.

FIG. 4 illustrates an Edit Profile Fields 400 page. Edit Profile Fields page 400 displays default fields 410 for the member profile for a particular group and enables an administrator or a member with administrator rights to add custom fields 420 to the group's member profile, or to remove custom fields from the profile. In various embodiments, default fields 410 are fields that are common to every user group and that may, for example, be pre-populated when a new invitee creates a profile for a particular group. In various embodiments, default fields may include the invitee's name, gender, e-mail address, city of residence and any other suitable member information that would be the same across all groups.

In various embodiments, the custom fields 420 are administrator-defined fields that are specific to the group. For example, for a TED2012 conference group, group-specific fields may include: (1) an area of expertise field 422; (2) a current organization field 424; (3) a current role field 426; (4) a past organization field 428; (5) a universities field 430; (6) a TED conferences attended field 432; and (7) other suitable fields that are related to the TED2012 conference group. The administrator-defined fields allows the group administrator to build a member profile template that best fits the purpose of the group and that provides searchable information for finding members.

Figure 5:
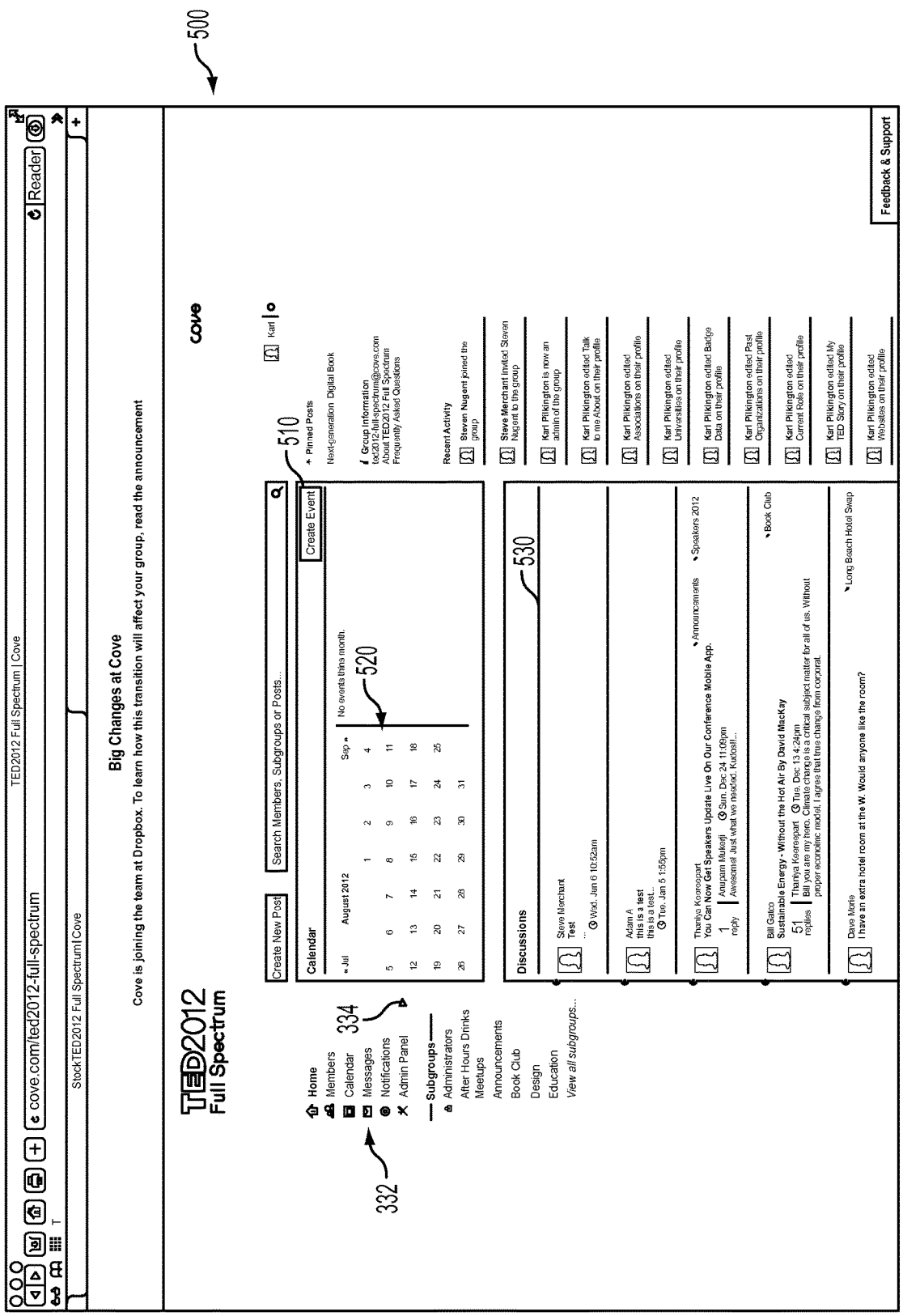
FIG. 5 is a screen display according to a particular embodiment that shows a home page for a group on the social networking system of FIG. 1.

FIG. 5 illustrates a Home page 500 for the TED 2012 group. This page: (1) contains a create event button 510 that enables the group's members to create events for the group; (2) displays a calendar 520 that displays events related to the group; and (3) provides a discussions post section 530 that lists entries created by the group's members.

Figure 6:
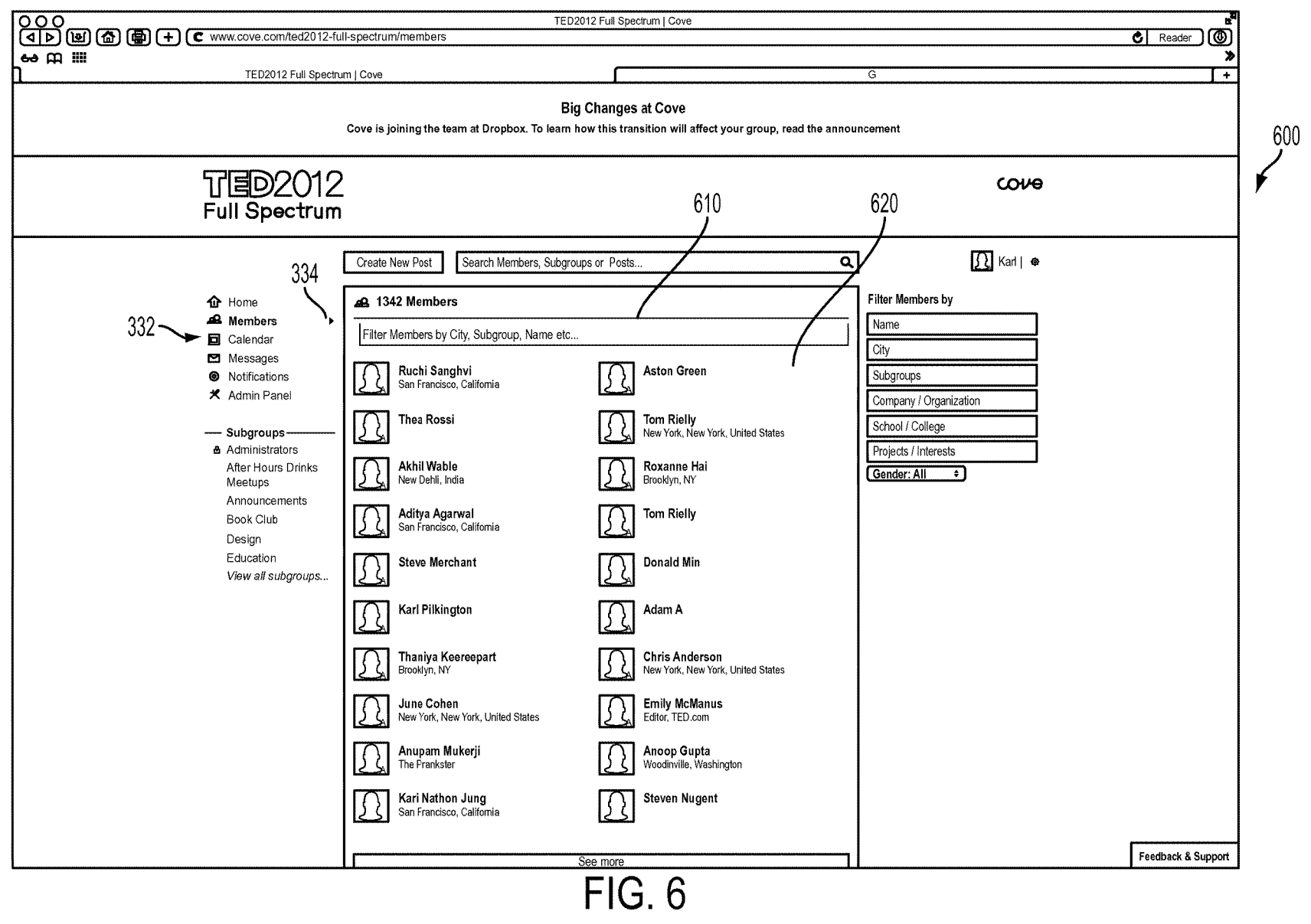

FIG. 6 illustrates a Members page 600 according to a particular embodiment. This page includes a search field 610 for filtering group members and displays a listing 620 of all members within a group. In various embodiments, members can use this page to perform a free text search using search field 610 to filter the listed members, as well as create new posts that are listed in discussion post section 530 (FIG. 5).

Figure 7A:
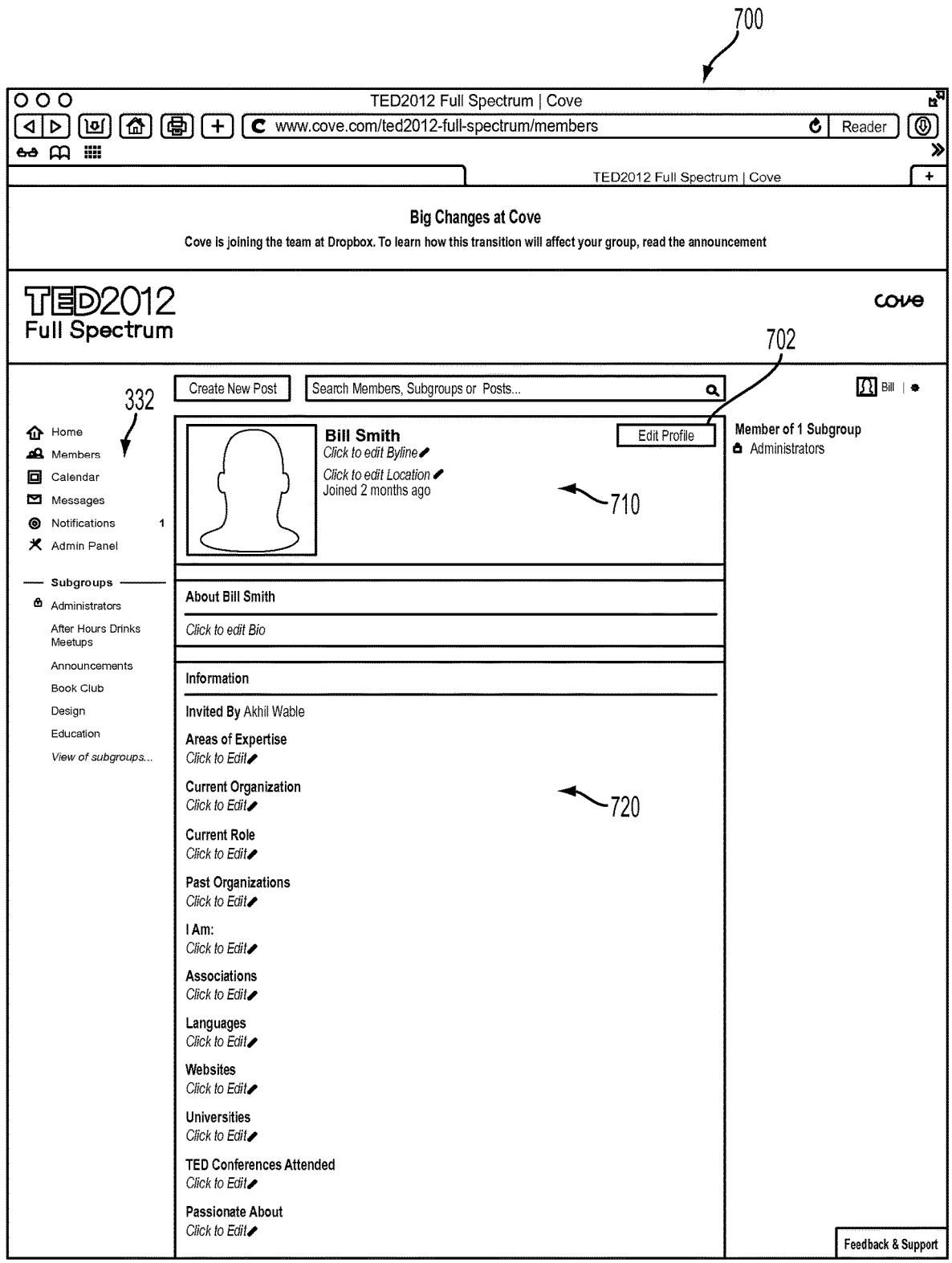
FIG. 7A is a screen display of a user's member page for use in conjunction with the group whose home page is shown in FIG. 5.
Figure 7B:
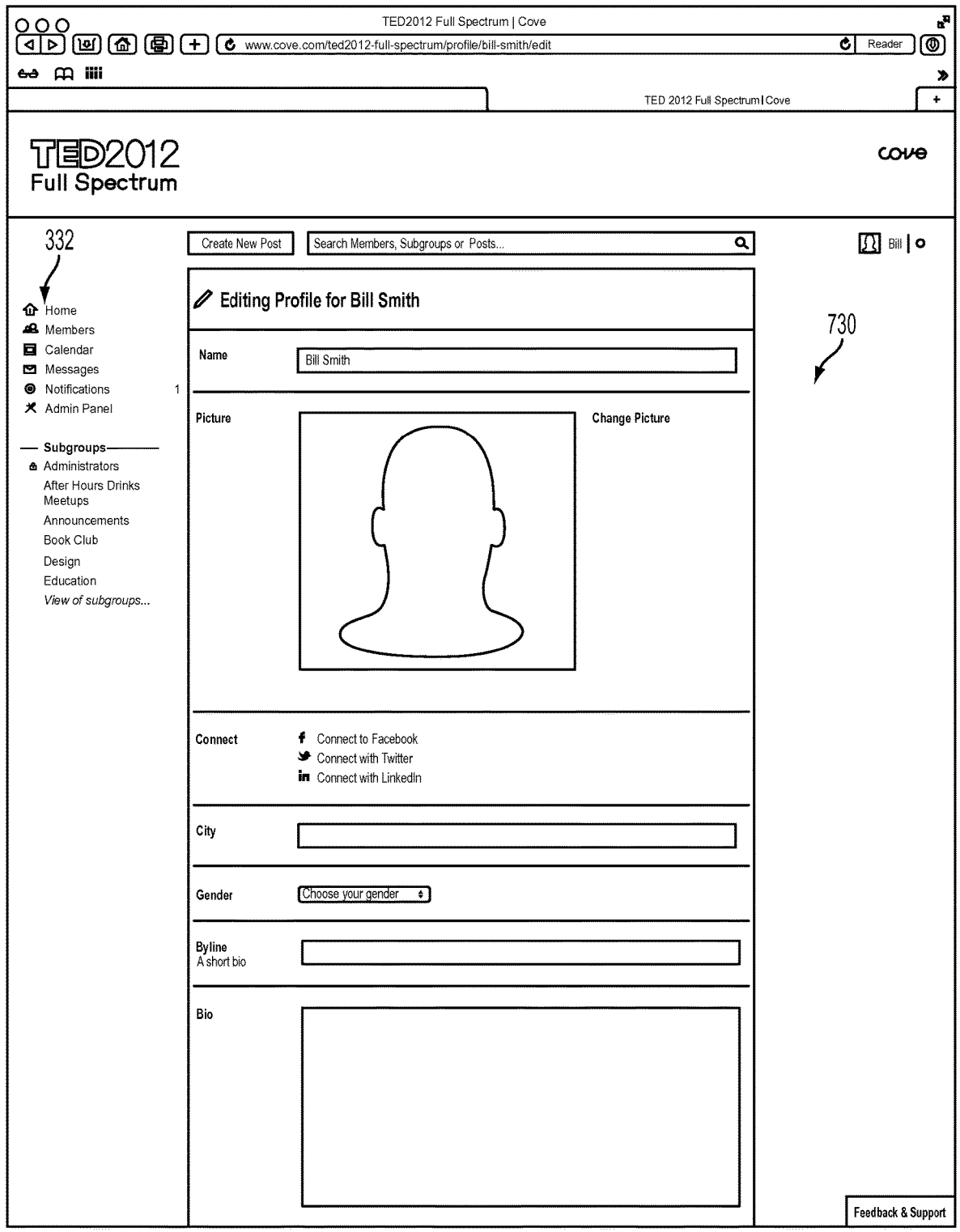
FIG. 7B is a screen display of the user member page of FIG. 7A in an edit mode.

FIG. 7A illustrates a Member Profile page 700. As may be understood from this figure, Member Profile page 700 may include a default member profile section 710 and a custom member profile section 720. Default member profile section 710 reflects default fields 410 in the member profile template of FIG. 4. In various embodiments, the system may auto-populate the fields since these are based on information that the user entered when joining the social networking site. Custom member profile section 720 corresponds to custom fields 420 in the member profile template of FIG. 4. In various embodiments, the user can select individual fields to edit, or the user can select "edit profile" link 702, which brings the user to Profile page 730 illustrated in FIG. 7B. Profile page 730 allows the user to edit all fields in their profile. In this way, the user can tab from field-to-field entering data to create their group-specific profile.

FIGS. 8A-8E, 9 and 10 collectively demonstrate a search process available in conjunction with various embodiments of the social networking site. The search process allows the user to enter a search 811 into a search box 810, and the system automatically generates a list of suggested search term/facet combinations that the user may select, at any time, to filter the list of members displayed below the search box. In various embodiments, the system will not alter the current displayed list of members until the user either selects one of the proposed search term/facet combinations, or presses their "enter" button. The system provides the list of suggested search term/facet combinations by searching one or more databases for the search term in combination with one or more non-user specified facets. A facet may correspond to one of the fields in the member profile template.

Once the system identifies search results in the one or more databases that are associated with the non-user specified facets, the system ranks the results to determine which of the results should be displayed to the user as suggested search term/facet combinations. In various embodiments, the system ranks the results by counting the number of times the search term/facet combination is found in the databases. The system then displays the four highest ranked search term/facet combinations.

In various embodiments, the system may search one or more databases that contain member profile data. In other embodiments, the system may search the profile databases in combination with a collaborative knowledge database that is built on structured data harvested from many sources, including individual wiki contributions. One such suitable database is Freebase, provided by Google, Inc. In some embodiments, the system may make a data call to the Freebase database using an API, and in various other embodiments, the Freebase database may be downloaded and stored locally on the system. It should be understood from reference to this disclosure that other suitable ranking systems may be used with the present search methodology.

The above described search methodology is advantageous when a user wants to search for a single term against data associated with multiple facets. That is, the present system allows a user to enter a single search term in one location, instead of having to enter the term in more than one location or using a complicated search string. Moreover, the user does not need to take the extra step of specifying a particular facet for the search since the system will conduct the search in data categories associated with all of the non-user specified facets. In alternative embodiments, the user could perform a traditional facet search by entering the search term in one of search boxes 813 (FIGS. 8A-8E) that is associated with a respective facet. In this case, the system will only search the database for profiles that contain the search term with the associated facet. In other embodiments, if the user presses their enter button without selecting a particular system suggested search term/facet combination, the system display a list of all members whose profile contains the search term in any of the non-user specified facet categories.

Figure 8B:
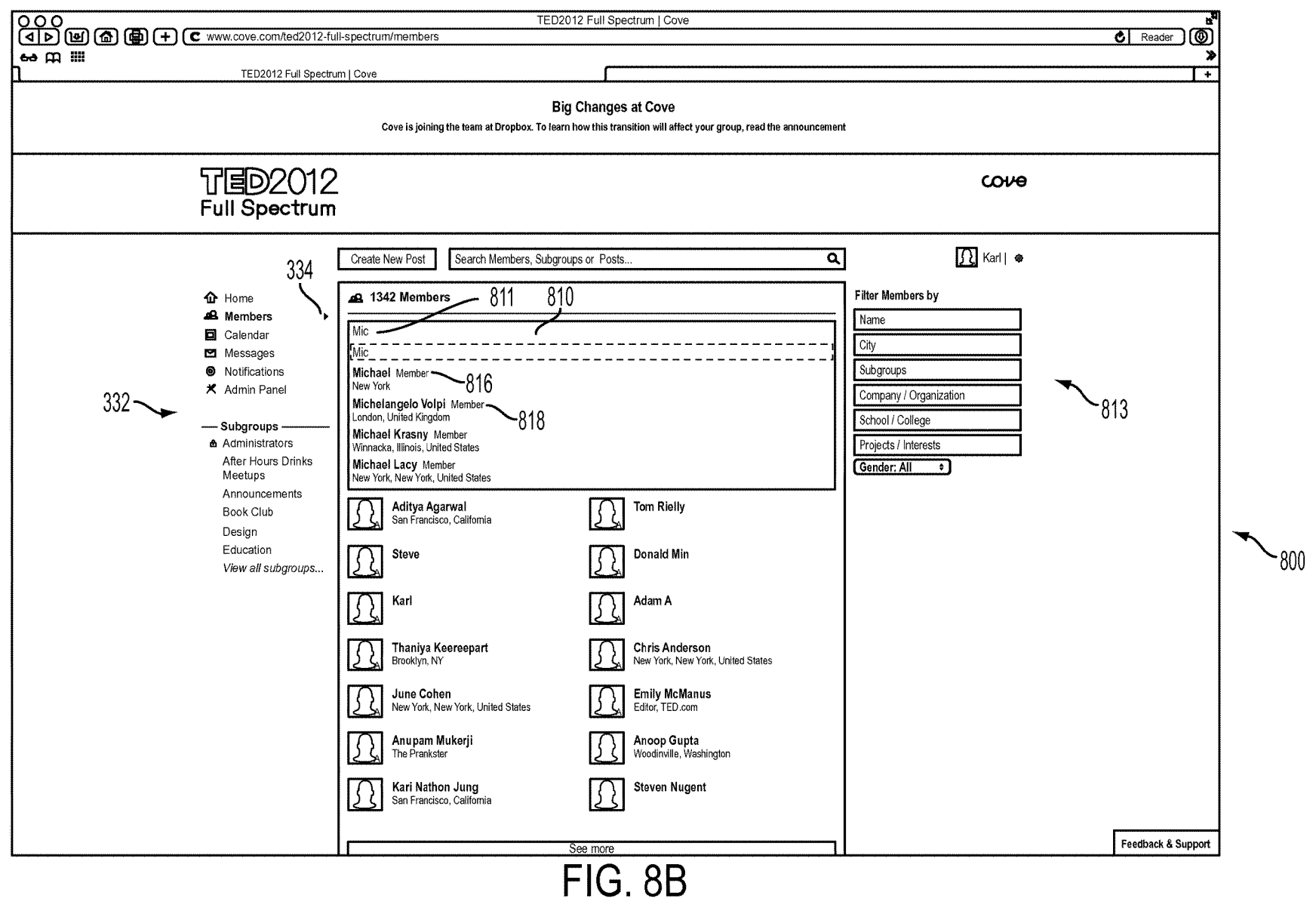
Figure 8D:
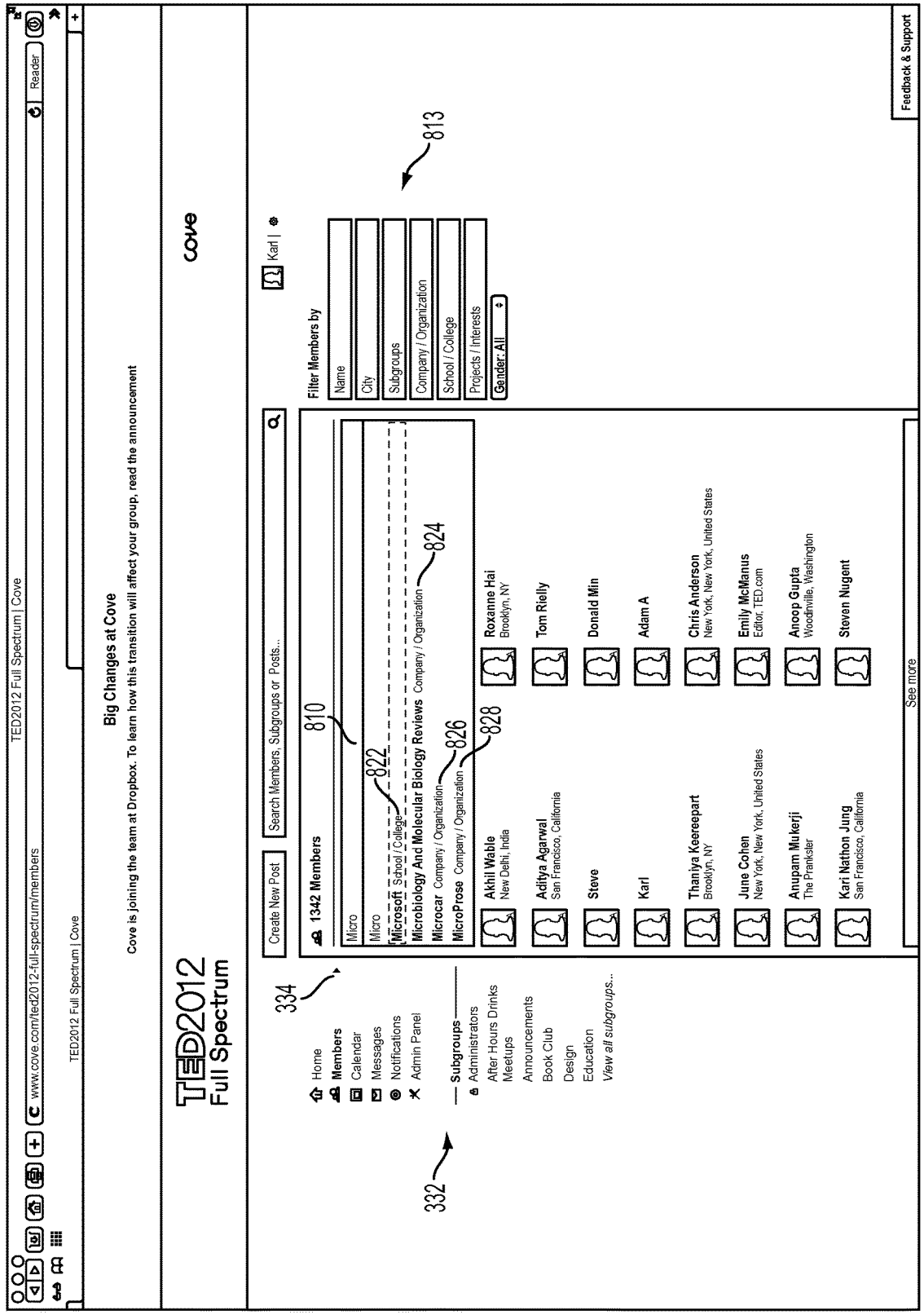

The following discussion provides a brief example of a search in accordance with the search methodology described above. Referring to FIG. 8A, a Member page 800 is illustrated with the beginning of a search 811 typed into search box 810. This particular example illustrates search 811 being performed with one letter, an "M". Initially, the system returns four suggested search term/facet combinations that happen to be potential names of members. FIG. 8B displays Member page 800 again, but this time search 811 is further developed and includes the additional letters of "I" and "C". Each time additional letters are added to search 811, the system imitates a new search in the database(s) and displays the highest ranked suggested search term/facet combinations. Thus, the displayed search term/facet combinations change as more letters are added to search 811. Referring to FIGS. 8C-8D, as search 811 is further developed, the system begins to return suggested search term/facet combinations that include company names and school names.

At this point in the search, the system either receives (1) the user's selection of the search term/facet combination from the displayed suggestions, or (2) additional letters that are added to original search 811, or the user presses their enter button and the system searches all non-user specified facets in the database(s) for matches. If the user selects one of the suggested search term/facet combinations, the system searches the profile database and identifies each user whose profile contains the selected search term in the associated facet. Next, the system displays the members that were identified. Thus, referring to FIGS. 8D-8E, if the user selects the term/facet combination "Microsoft—School/College", the system displays all users that listed "Microsoft" as a school/college in their profile. Additionally, the system displays a search filter button 830 on member page 800 to indicate to the user that the member list is filtered by the search term/facet indicted by the filter button 830 (e.g., "Microsoft—School/College").

Figure 8E:
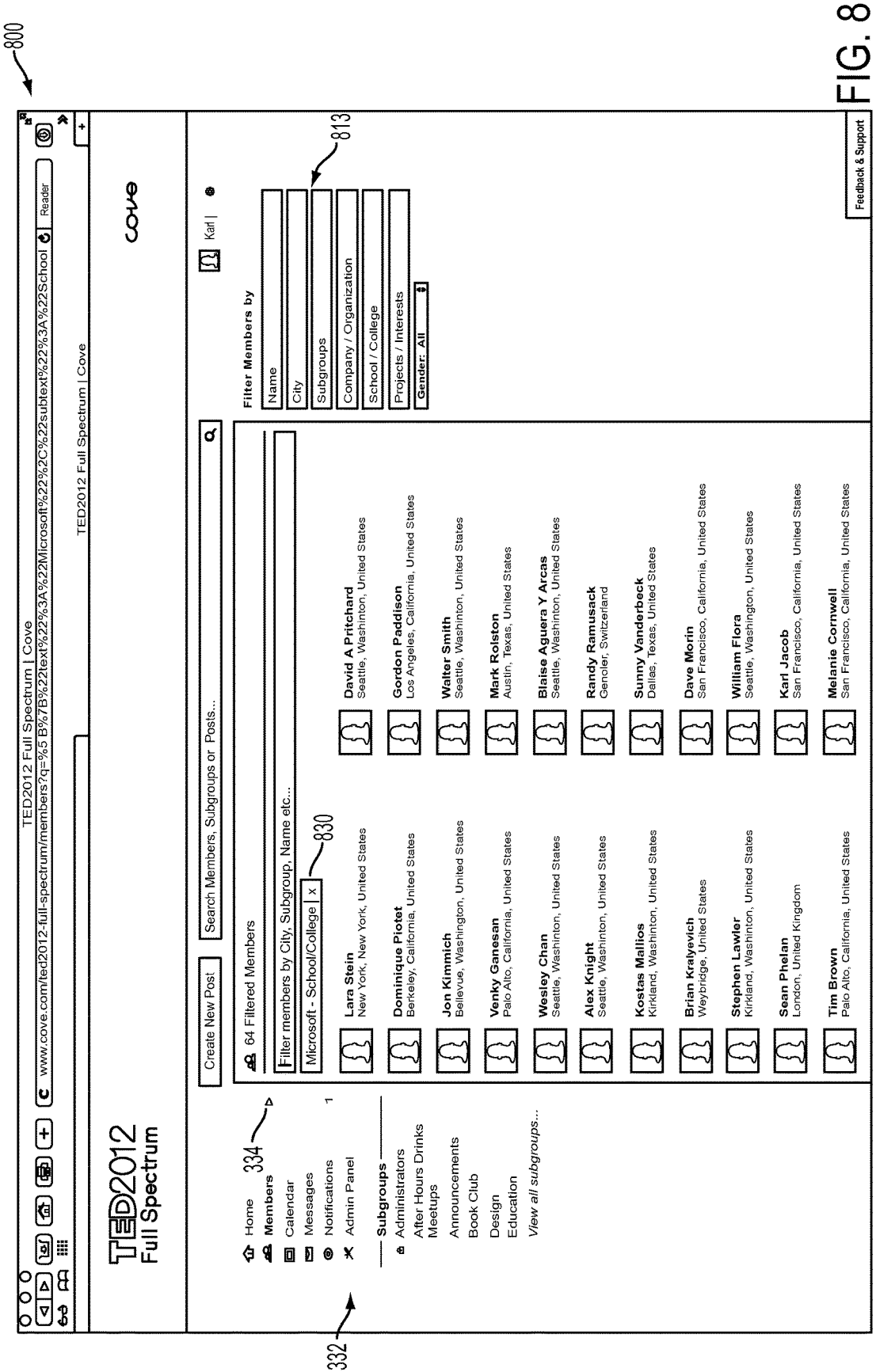
Figure 9:
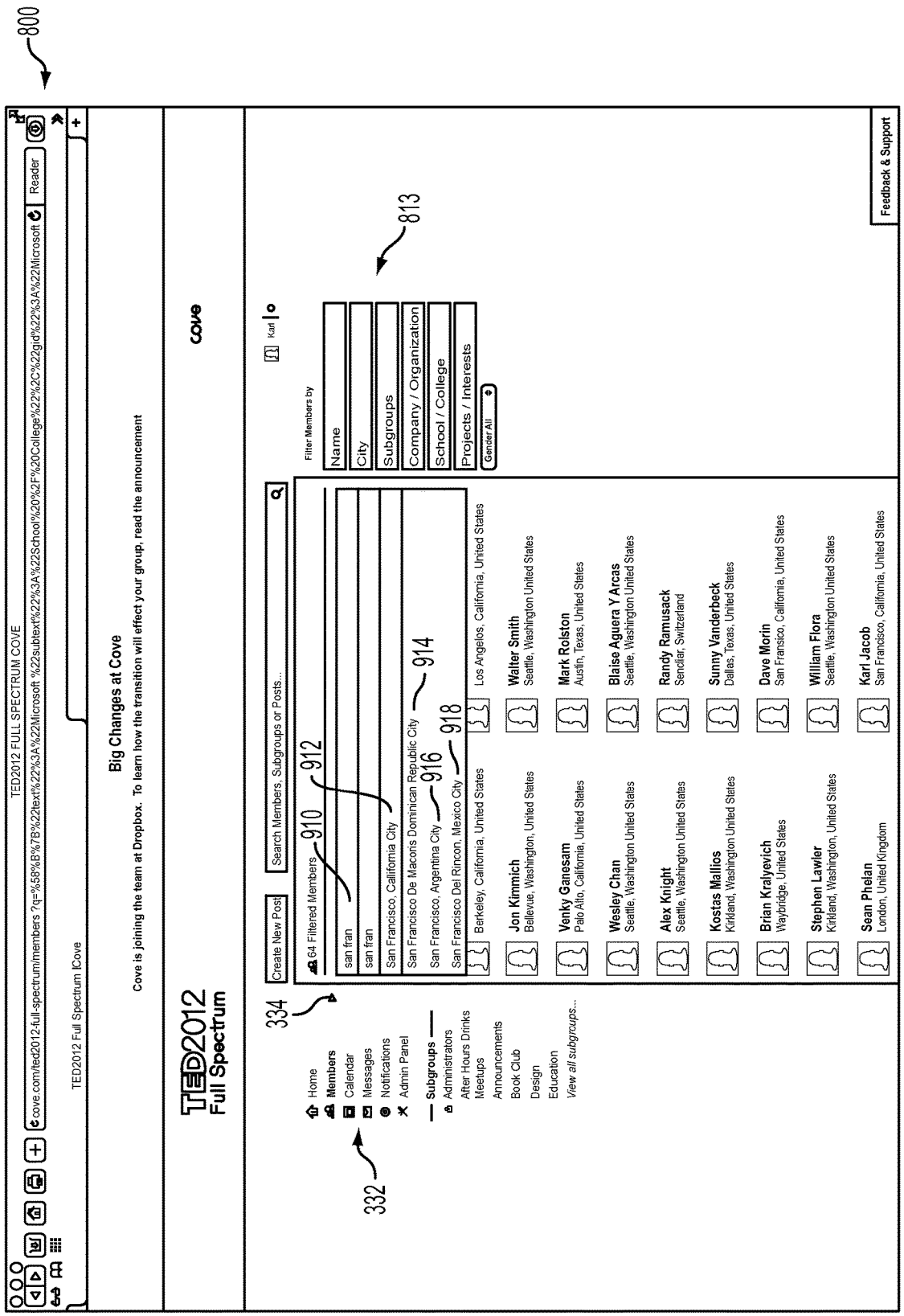
FIG. 9 is a screen display according to a particular embodiment that shows a search on a secondary search term.
Figure 10:
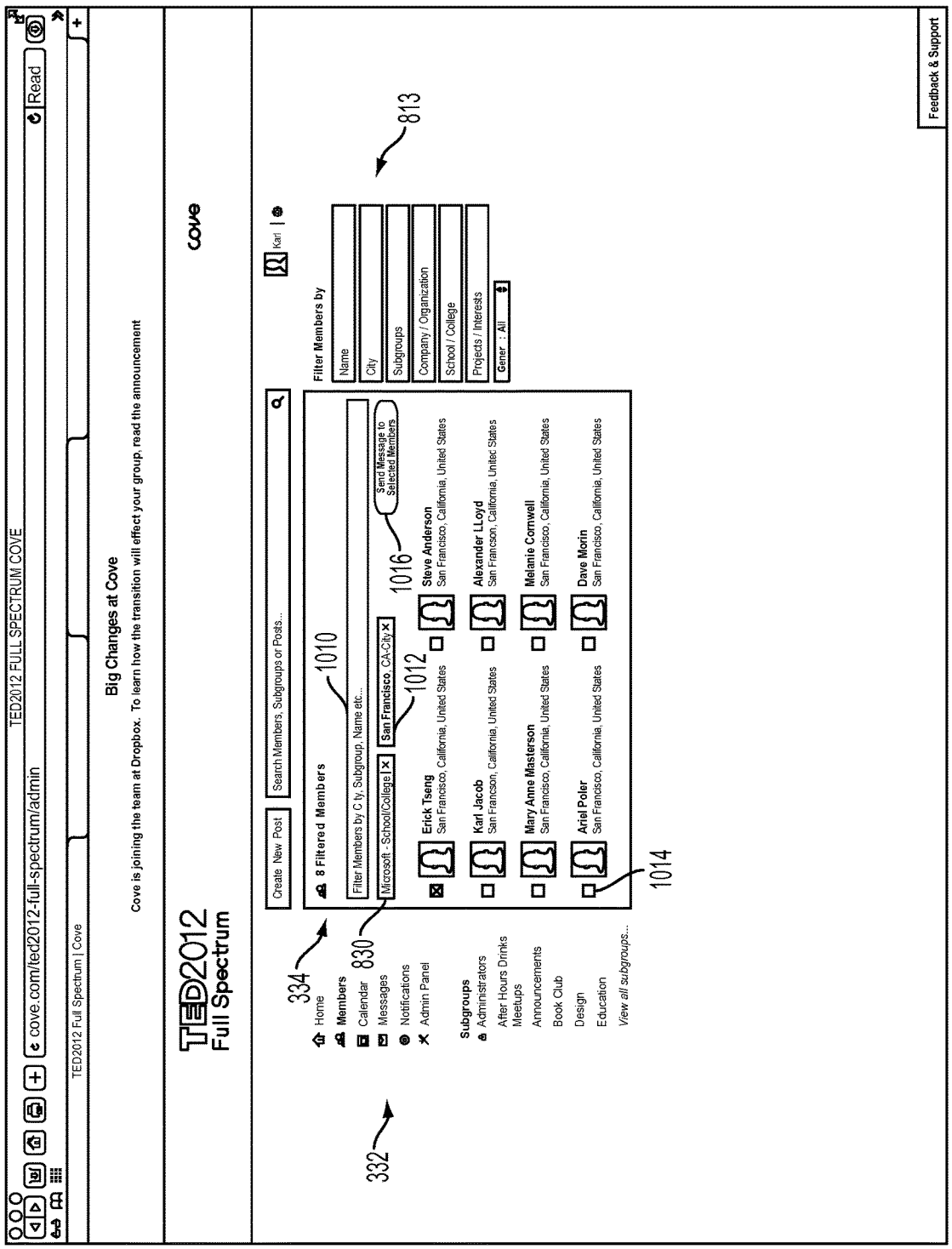
FIG. 10 is a screen display according to a particular embodiment that shows a filtered listing of group members that is defined by the searches of FIGS. 8A-8E and 9.

If, instead, the user adds additional letters to further develop his search, the system repeats the above described search methodology and returns new suggested search term/facet combinations. FIG. 9 displays Members page 800 with a secondary search 910 performed on the list of members that resulted from the selection of the search term/facet combination "Microsoft-School/College" in FIG. 8E. Referring to FIG. 10, once the user selects a second search term/facet combination, a second search filter button 1012 appears adjacent to search filter button 830 to notify the user that the member list has been filtered by another term.

In various embodiments of system 100, when a user performs a search, the system may search one or more user profiles associated with each user on the social networking site, instead of only searching a user profile associated with a particular group. In this way, the user is not limited to searching member profiles for a particular group.

Exemplary Operation

Figure 11:
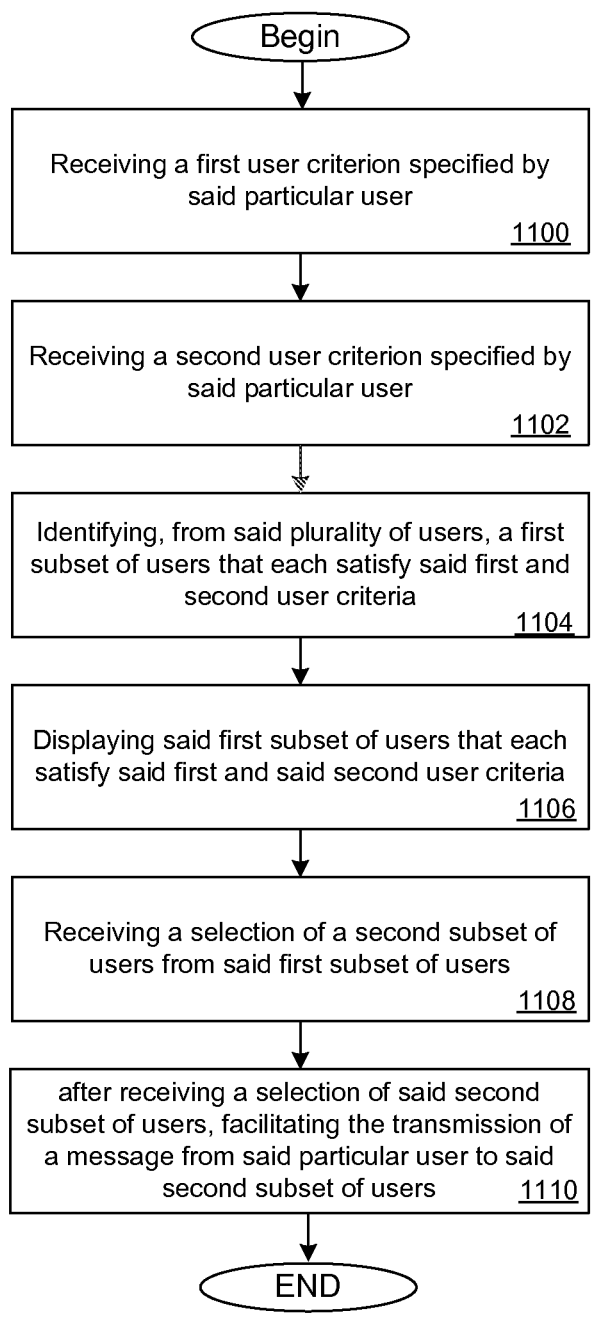
FIG. 11 is a flow chart depicting the operation of the web hosting system of FIG. 1.

Web server 112 may alone, or in combination with other computers, perform the method steps of FIG. 11. It should be understood by reference to this disclosure that these methods describe exemplary embodiments of the method steps carried out by the present system, and that other exemplary embodiments may be created by adding other steps or by removing one or more of the method steps described in FIG. 11.

When a user of the social networking site wants to communicate with a group of members that have certain attributes in common with the user, the user may search for members that contain one or more attributes (e.g., attended a certain school, work for a particular employer, and/or live in a particular city) and communicate with the subset of members whose user profile contains the one or more attributes. Thus, the social networking site allows users to send messages to a select subset of members of a group on the social networking site.

FIG. 11 depicts an exemplary method for searching for a subset of members of a social networking site whose profile contains certain search criteria. Once the subset of members is determined, the system allows the searcher to select one or more of the subset of members to define a second subset of members. The system then enables a communication to the selected second subset of members. In various embodiments, each user creates a group profile for each group they join. Thus, a user of the social networking site may have more than one user profile, each being unique to a specific group. The method steps illustrated in FIG. 11 may be performed by a single processor, multiple processors, Beginning at step 1100, social networking system 100 receives a first user criterion that is specified by a particular user. The first user criterion, in various embodiments, may be a search term, such as a name, a city, a college or any other suitable search criteria. In various embodiments, the first criterion is entered into search box 810 (FIG. 8A). At step 1102, system 100 receives a second user criterion that is specified by the particular user. The second user criterion, similar to the first criterion, may be a second search term. At step 1104, system 100 identifies, from the plurality of users on the social networking system a first subset of users that have one or more profiles that contain the first and second criteria. At step 1106, system is configured to display the first subset of users. The display of the first subset of users may only include a name of each user and a picture of the user. In other embodiments, the display of the first subset of users may include the name, a picture and at least a portion of the users profile.

At step 1108, the system receives, from the particular user, a selection of a second subset of users from the first subset of users. In various embodiments, the particular user can select one or more of the users from among the displayed second subset of users. In various embodiments, a selection box or button may be displayed adjacent each user of the second subset. In other embodiments, system 100 may be configured to highlight each selected user when the particular user clicks on a displayed user's picture. In all embodiments, the system is configured to allow the particular user to select one or more of the users of the second subset of users. At step 1110, after receiving a selection of the second subset of users, the system enables the transmission of a message from the particular user to the second subset of users. In some embodiments, the message is an e-mail, and in other embodiments, the message may be a wall posting, a text message, an instant message or any other suitable type of communication that transmits a voice or data communication.

In various embodiments, the system may receive the first user criterion and identify one or more users that have one or more group profiles that satisfy the first criterion. In these embodiments, the system may then display the one or more users to the particular user. The system may then receive the second user criterion from the particular user. Once again, system 100 may then identify a first subset of users, from the one or more user, who have one or more profiles that contain both the first and second criteria. Once the first subset of members is identified, the system may display the first subset of members. The system may then receive a selection of a second subset of users from the first subset of users. After receiving the selection of the second subset of users, the system enables the transmission of a message from the particular user to the second subset of user.

Exemplary User Experiences

The operations of exemplary embodiments of the system are perhaps best understood by reviewing particular examples. The following examples describe an exemplary experience of a group administrator and group members.

Administrator Experience

A group administrator is initially assigned administrator rights when a group is created on the social networking site. That is, in some embodiments, the creator of the group is appointed as the group's administrator. Thus, for the TED2012 Group, once the group is created and the administrator logs into the TED2012 group, the administrator creates a description of the group. For example, referring again to FIG. 3, the administrator adds the group logo at 322, adds a group cover photo at 324 and drafts a group description at 326. Moreover, the administrator also creates the unique fields necessary for the members of the group to create a member profile. To do this, the administrator selects "edit member profile" link 318 to open the member profile template as discussed below.

Referring to FIG. 4, once "edit member profile" link 318 is selected, the user's browser opens the Profile Fields page 400. On this page, the administrator can customize the fields that appear on the group's member profile template. That is, in addition to default fields (e.g., name, gender, email address and city) 410, the administrator can add custom fields 420 that enable users to input information in either a list form or as free text. For example, the administrator may want group members to indicate their areas of expertise in the form a list. In this example, the administrator types "Area of Expertise" in a custom field 422 and selects "list of things" from format selection menu 424. In another field 426, the administrator may want group members to describe their role in an organization. Thus, the administrator types "Current Role" in the custom field 426 and selects "text" in format selection menu 428. The administrator may click "Remove" 430 beside a custom field to remove it, or add more custom fields. Once the administrator completes making changes to the template, the administrator clicks "Save Changes" (not shown) to save the member profile template. The administrator may then invite members to join the group by clicking "invite members" button 330 on the member management page 300 (FIG. 3). The profile template is now visible to group members as members accept their invitation to join the group.

Group Member Experience

A user of the social networking site receives an e-mail invitation from the administrator of the TED2012 group to join the group. After accepting the invitation and joining the group, the group member can set up their member profile (this may be optional or mandatory). The member profile template is specific to the TED2012 group only.

Once the user joins the group, he can set up his profile, participate in group discussions and access Members page 600 (FIG. 6). For example, once the member accepts the invitation to join the group, he may be directed to member profile page 700, which is shown in FIG. 7A. From this page, the member can review his default profile data in section 710. In various embodiments, the member can edit his default profile data by, for example, clicking a "click to edit by line" link 704, which allows the user to change the information associated with that link (e.g., the name that is displayed in his profile). The member may also select the "click to edit location" link 706 to change the location displayed in his profile. To expedite the creation of a profile, the member may also click "edit profile" link 702, which will take the member to edit profile page 750. On this page, the member can tab between information boxes to add the required information to his profile. Once the member completes the requested information to form his profile, the member can click a "save changes" button (not shown) to save his profile to the system. In various embodiments, this profile is unique to the TED2012 group and is only used for this group.

Still following the example discussed above, the user who just joined the TED2012 group also receives an invitation to join a group dedicated to the preservation of wildlife and nature. After accepting the invitation and joining the group, the member is able to set up a member profile that is completely different and separate from the member profile seen by the TED2012 group. Some of the fields for the wildlife preservation group may be the same as those in the TED2012 group. For instance, both group profiles include past organizations and languages spoken. Because the member created his TED2012 profile first, in some embodiments, the social networking site may auto-populate information from that profile in the common fields of the member profile template for the preservation of wildlife and nature. However, in various embodiments, the member may edit the information in these fields to make each profile more specific to the group. Once the user joins the group and completes the profile, he can also participate in discussions and see members in this group, but his member profile for this group will remain separate from the TED2012 group member profile.

Search Experience

Referring once again to FIG. 6, the search box 610 allows a member to search for other members that have common interests. For example, the member of the group may want to find all members that attended the "Microsoft" college. Thus, the member may conduct a search by typing in a free-text word (e.g., "Microsoft") to see all members whose profile lists "Microsoft" as a college/university.

Returning to the example and referring to FIG. 8A, a member would like to identify other members of the TED2012 group who attended the Microsoft School and lives in his city. In search field 810 on Members page 800, the member begins typing the letter "M". System 100 begins to display a list of suggested search term that begin with the letter "M" and that are associated with one or more system-designated facets. As described above, the system searches one or more databases for all data that begins with the letter "M" and that is associated with one of the system-designated facets. The system then ranks the results and displays the four highest ranked results. Thus, for example and still referring to FIG. 8A, the names "Donald Min" 812 and "Anupam Mukerji" 814 are returned in addition to two other names. Referring to FIG. 8B, as the member adds additional letters to the search term (e.g., "M", "I" and "C"), the system returns new suggested search terms that begin with the letters "M", "I" and "C". In this example, one of the names returned is "Michael" 816, which refers to all members having the name "Michael" and the name "Michelangelo Volpi" 818.

As the member continues to develop the search by adding additional letters to the search term (e.g., by typing "R" and "O" after "MIC"), the system (1) identifies search terms that begin with the letters "MICRO" in combination with the system-specified facets, (2) ranks the results based on the number of times the terms appear in the one or more databases being searched, and (3) displays the four highest ranked search term/facet combinations. Referring to FIG. 8C, the system provides the highest ranked results as follows:

| Search Term | Facet |
|---|---|
| Microsoft - 822 | school/college |
| Microbiology and Molecular Biology Reviews - 824 | company/organization |
| Microcar - 826 | company/organization |
| Microprose - 828 | company/organization |

As illustrated in FIG. 8D, the member selects the search term/facet combination "Microsoft—School/College" because he is searching for group members that attended "Microsoft" the school. Referring to FIG. 8E, the system displays a list of members who specified Microsoft as their "School/College". Moreover, a button 830 displaying "Microsoft—School/College" appears below the search box 810. button 830 provides an indication to the member that the member list has been filtered by the term/facet "Microsoft—School/College". Should the member wish to remove this filter, in various embodiments, he could click on button 830 to remove the "Microsoft" filter.

At this point, the member would like to know if any of the members who attended Microsoft the school are also located in San Francisco, Calif. Thus, referring to FIG. 9, the member can begin typing the letters "San Fran" in search field 910, which returns various suggested search term/facet combinations such as:

| Search Term | Facet |
|---|---|
| San Francisco, California - 912 | City |
| San Francisco De Macoris, Dominican Republic - 914 | City |
| San Francisco, Argentina - 916 | City |
| San Francisco Del Rincon, Mexico - 918 | City |

In this example, the highest ranked search term/facet combinations all contain the facet "city". The member clicks "San Francisco, Calif.—City" since he is looking for members who attended Microsoft the school and who also live in the city of San Francisco, Calif. Referring to FIG. 10, when "San Francisco, Calif.—City" is selected, another filter indication button 1012 appears adjacent the Microsoft button 830, this one displaying "San Francisco, Calif.—City". Moreover, the member list filters even further to display only TED2012 members who live in San Francisco and who attended Microsoft the school. The member can now direct messages through e-mail, a wall post, instant message, through an invite or any other suitable communication means to specific members that meet this search criteria by checking a selection box 1014 next to each member, and by clicking a "send message to selected members" button 1016. In various embodiments, the selection boxes may not be used. Instead, a message is sent to all of the members of the filtered result by clicking the "send message to selected members" button 1016. In various other embodiments, other means may be used to individually select members to include in a private communication. For example, clicking on a member may highlight that member, where the member can select one or members to include in the communication. Thus, the system provides an efficient means searching for members that meet one or more specific criteria and facilitating a communication to a selected subgroup of those members.

Conclusion

Many modifications and other embodiments of the invention will come to mind to one skilled in the art to which this invention pertains having the benefit of the teachings presented in the foregoing descriptions and the associated drawings. It should also be understood that, although various embodiments are described above as using a structured database, any other suitable data structure can be used to allow for free-text searches.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A computer system for facilitating communications between a particular user in a first group on a social networking system and one or more other users from a plurality of users in the first group, the computer system comprising one or more processors configured to:
   a. receive a first user search criterion specified by the particular user;
   b. receive a second user search criterion specified by the particular user;
   c. store a first member profile having information for each of the plurality of users in the first group, wherein the first member profile is based on a first member profile template comprising a default set of user fields;
   d. identify by the one or more processors, from the plurality of users associated with the first member profile template that is unique to the plurality of users, a first subset of users that each satisfy the first and second user search criteria, wherein the first subset of users has fewer users than the plurality of users;
   e. associate, by the one or more processors, each one of the first subset of users with a respective selection region;
   f. receive, from the particular user, a selection of a second subset of users, each of which is selected from the first subset of users that satisfy the first and second user search criteria;
   g. receive, from the particular user, an identification of a set of customized fields distinct from the default set of user fields;
   h. enable, by the one or more processors, the creation of a second member profile template, distinct from the first member profile template, that is unique to a second group that is associated with the selection of the second subset of users filtered from the first subset of users that satisfy the first and second user search criteria, wherein the second member profile template comprises the default set of user fields and the set of customized fields; and
   i. after receiving a selection of the second subset of users, initiate the transmission of a direct communication from the particular user to the second subset of users, wherein the direct communication is an invitation to only the second subset of users as new members to the second group, and upon acceptance of the invitation by users of the second subset of users, each accepting user of the second subset of users establishes a second member profile utilizing the second member profile template for the second group based on each of the default set of user fields and the set of customized fields, wherein the second member profile template is visible to each accepting user.

2. The computer system of claim 1, wherein the direct communication is an e-mail message.

3. The computer system of claim 1, wherein the direct communication is a private posting on a public wall that is only viewable by the second subset of users.

4. The computer system of claim 1, wherein the plurality of users are members of a first group within the context of a social networking site.

5. The computer system of claim 4, wherein the one or more processors is are further configured to search the first member profile for each of the plurality of users to determine whether each of the plurality of users satisfies the first and the second user criteria, wherein the first member profiles are unique to the first group that the plurality of users belong on the social networking site.

6. The computer system method of claim 1, wherein the one or more processors are further configured to search a plurality of member profiles for each of the plurality of users to determine whether one of the plurality of member profiles for each of the plurality of users satisfies the first and the second user criteria.

7. The computer system of claim 1, wherein the one or more processors are further configured to allow the particular user to activate a selection box at the respective selection region associated with each one of the first subset of users to be include in the second subset of users.

8. A computer system configured to enable communication between a particular user of a social networking system and a plurality of other users of the social networking system where each one of the plurality of other users is associated with a plurality of profiles, comprising one or more processors configured to:
   a. receive a request, from a client device for the particular user, to search the plurality of profiles, associated with a first member profile template, for each one of the plurality of other users for a first search criterion;
   b. in response to receiving the request from the client device, search by at the least one processor the plurality of profiles, associated with the first member profile template, for each one of the plurality of other users for the first search criterion;
   c. initiate, by the one or more processors, a display of a listing of a plurality of users from the plurality of other users, each one of the plurality of users associated with a respective selection region, wherein each one of the plurality of users has one profile from the plurality of profiles that satisfies the first search criterion and wherein the plurality of users has fewer users than the plurality of other users;
   d. receive, by the one or more processors, an identification of a set of customized fields distinct from a default set of user fields;
   e. enable, by the one or more processors, the creation of a second member profile template for new members to a member group that is unique to the plurality of users who have at least one profile from the plurality of profiles that satisfies the first search criterion, wherein the second member profile template comprises the default set of user fields and the set of customized fields; and
   f. enable, by the one or more processors, a communication between the particular user and new members, wherein the direct communication is an invitation to each new member, and upon acceptance of the invitation by each new member, each accepting new member user establishes a member group profile utilizing the second member profile template for the member group, wherein the second member profile template is visible to each accepting new member.

9. The computer system of claim 8, wherein the communication is an e-mail.

10. The computer system of claim 8, wherein the communication is a discussion posting that is only viewable by the group of members.

11. The computer system of claim 8, wherein the one processor or more processors is further configured to:
   a. after the step of displaying a plurality of users from the plurality of other users, receive a second request from the particular user to search the plurality of users who has at least one profile from the plurality of profiles that satisfies the first criterion for a second criterion;
   b. in response to receiving the second request, search the plurality of users for the second criterion; and
   c. initiate a display of a listing of a plurality of users from the plurality of users who has at least one profile from the plurality of profiles that satisfies the first and the second criteria,
   wherein facilitating a communication further comprises facilitating the communication between the particular user and the plurality of users who has one profile from the plurality of profiles that satisfies the first and the second criterion.

12. The computer system of claim 8, wherein facilitating a communication between the particular user and the second subset of users further comprises sending an e-mail to the second subset of users.

13. A computer-implemented method of facilitating communications between a particular member of a social networking group on a social networking system and at least one other member of the social networking group where the at least one other member of the social networking group has a profile that is created when the at least one member joined the social networking group, the method comprising:
   a. receiving, from a client device, a first search criterion specified by the particular member;
   b. in response to receiving the first search criterion, identifying, by one or more processors, a first subset of members of the social networking group whose member profile for the social networking group, associated with a first member profile template, satisfies the first search criterion and wherein the first subset of users has fewer users than the social networking group;
   c. associating, by the one or more processors, each one of the first subset of users with a respective selection region;
   d. receiving, from the particular member, a selection of a plurality of members from the first subset of members;
   e. receive, from the particular member, an identification of a set of customized fields distinct from a default set of user fields;
   f. enable, by the one or more processors, the creation of a second member profile template that is unique to a member group that is associated with the selection of a plurality of members from the first subset of members, wherein the second member profile template comprises the default set of user fields and the set of customized fields; and
   g. in response to receiving the selection of the plurality of members from the first subset of members, facilitating, by the one or more processors, a communication between the particular member and the selected plurality of members, wherein the communication is an invitation to each of the members of the member group, and upon acceptance of the invitation by each of the members of the member group, each accepting member establishes a member group profile utilizing the second member profile template for the member group, wherein the second member profile template is visible to each accepting member.

14. The computer-implemented method of claim 13, wherein facilitating the presentation of the first subset of members further comprises facilitating a display of a portion of the member profile for each member of the first subset of members.

15. The computer-implemented method of claim 13, wherein the selection of the plurality of members from the first subset of members further comprises allowing the particular member to individually select specific members from the first subset of members for inclusion in the plurality of members.

16. The computer-implemented method of claim 13, wherein the facilitating a communication further comprises sending an e-mail from the particular member to the plurality of members.

17. The computer-implemented method of claim 13, wherein the first search criterion is matched to a field within the profile for each member of the plurality of members.

18. A computer system for facilitating communications between a particular member of a social networking site and at least one other member of the social networking site comprising:

a. one or more processors;
b. a non-transitory computer readable medium comprising processor executable instructions stored thereon;
c. a means for receiving a first search criterion specified by the particular member;
d. a means for identifying a first subset of members of the social networking group whose member profile for the social networking group, associated with a first member profile template, satisfies the first search criterion and wherein the first subset of users has fewer users than the social networking group;
e. a means for associating each one of the first subset of users with a respective selection region;
f. a means for receiving a selection of a plurality of members from the first subset of members;
g. a means for receiving an identification of a set of customized fields distinct from a default set of user fields;
h. a means for enabling the creation of a second member profile template that is unique to a member group that is associated with the selection of the plurality of members from the first subset of members wherein the second member profile template comprises the default set of user fields and the set of customized fields; and
i. a means for facilitating a communication between the particular member and the member group, wherein the communication is an invitation to each member of the member group, and upon acceptance of the invitation by each member of the member group, each accepting member establishes a member group profile utilizing the second member profile template for the member group, enabled as visible to each accepting member.

* * * * *

UNITED STATES PATENT AND TRADEMARK OFFICE
CERTIFICATE OF CORRECTION

PATENT NO. : 10,778,733 B2
APPLICATION NO. : 13/832774
DATED : September 15, 2020
INVENTOR(S) : Akhil Wable et al.

Page 1 of 1

It is certified that error appears in the above-identified patent and that said Letters Patent is hereby corrected as shown below:

In the Claims

Claim 5, Column 15, Line 2, delete "is"

Signed and Sealed this
Twentieth Day of October, 2020

Andrei Iancu
*Director of the United States Patent and Trademark Office*